United States Patent Office 3,483,093
Patented Dec. 9, 1969

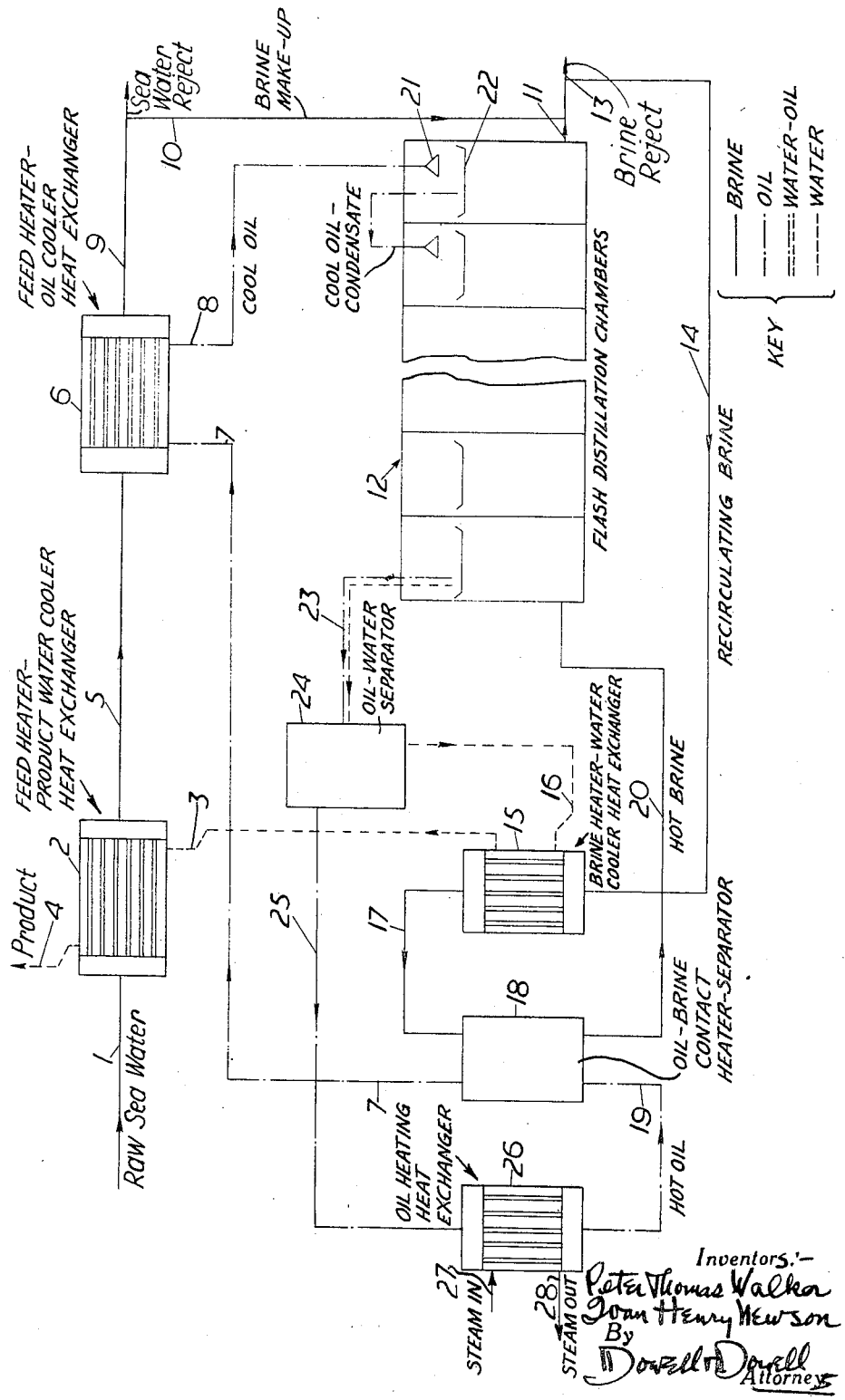

3,483,093
DESALINATION PROCESSES AND APPARATUS
Peter Thomas Walker, Reading, and Ivan Henry Newson, Chilton, Berkshire, England, assignors to Weir Westgarth Limited, Cathcart, Glasgow, England, a British company
Continuation of application Ser. No. 540,407, Apr. 5, 1966. This application Jan. 7, 1969, Ser. No. 791,869
Claims priority, application Great Britain, Apr. 5, 1965, 14,450/65
Int. Cl. C02b *1/06;* B01d *3/06*
U.S. Cl. 203—11                    10 Claims

ABSTRACT OF THE DISCLOSURE

The invention provides a flash distillation process and apparatus for the desalination of sea water in which an immiscible oil is used as a heat transfer liquid which makes direct liquid/liquid contact with the incoming brine. The feed brine is first warmed by indirect heat exchange with the outgoing distilled water product in the heat exchanger 15. It then enters a direct liquid/liquid contactor 18 where it meets immiscible hot oil that has previously been heated by steam in an indirect heat exchanger 26. After mingling and heat transfer between the hot oil and the brine in the contactor 18 the brine separates and is fed alone via the line 20 of the flash distillation chambers 12. The oil leaving the contactor 18 via the line 7 is then passed in indirect heat exchange with incoming feed brine in the heat exchager 6 and on leaving that heat exchanger, being now cool, the oil is used as a condensing spray into the condenser section of the last of the flash chambers 12. Condensate product mixed with the oil is withdrawn from the condenser section of the first flash chamber via the conduit 23 and is separated from the oil in a separator 24.

---

This application is a continuation of Ser. No. 540,407 filed Apr. 5, 1966, now abandoned.

DESCRIPTION OF INVENTION

The present invention relates to desalination processes and apparatus.

Flash distillation is one practical method of effecting desalination of sea water in order, for example, to provide fresh water of drinking quality or suitable for agricultural use. In a conventional flash distillation plant the heated brine is caused to flow through a series of flashing chambers in each of which a proportion is converted into steam and is condensed within the chamber in order to provide the fresh water. This condensation is normally effected upon condenser tubes and it can be shown from theoretical considerations that the temperature drop across these tubes must inevitably result in a loss of efficiency. Furthermore, these condensers are cooled by brine and in consequence some form of scaling is almost inevitable within the condenser tubes, thus increasing the loss of efficiency. Also in the conventional scheme the brine is heated in a heat exchanger using external process heat, for example steam, and this heat exchanger is likewise very subject to scaling with consequent loss of efficiency.

It is an object of the invention to provide a new or improved desalination process with the view to overcoming the problems outlined.

According to the present invention a desalination process comprises applying external heat to a waterimmiscible oil, heating the brine by means of liquid/liquid contact between the hot oil and the brine, separating the oil from the brine and thereafter passing the brine to one or more flash distillation chambers.

According to a further aspect of the present invention there is provided apparatus for carrying out the above process comprising primary heating means effective to heat water-immiscible oil, means passing such hot oil to a liquid/liquid contactor to heat raw liquid feed therein, means withdrawing hot liquid feed from such contactor and passing the same to one or more flash distillation chambers and means for withdrawing condensate from such chambers.

In the preferred scheme, the hot oil recovered from the step of heating the brine is first cooled by contact with relatively cool brine, for example make-up sea water, and is then used to condense the steam in the flash distillation chambers by spraying directly into such chambers. The product obtained from the flash distillation chambers will then comprise an oil-water mixture which is separated to provide the fresh water product and to recover the oil for heating in the primary heating means by an external heat source.

The external heat source may be process steam.

Any suitable water-immiscible organic liquid may be be used as the oil but conveniently a long chain paraffin is used, for example a paraffin having 10 carbon atoms in the chain. Such paraffins are characterised by extreme insolubility in water, have no objectionable odours and are not poisonous. There heat capacity is only about half that of water and in consequence the circulating stream of oil needs to be approximately twice the volume of the recirculating stream of water.

In order that the present invention may more readily be understood one embodiment of the same will now be described by way of example and with reference to the accompanying drawing which is a schematic flow diagram.

In the flow diagram, brine flows are illustrated in full lines, fresh water flows in dotted lines and oil flows in chain dotted lines.

Referring now to the accompanying drawing, brine is supplied via a conduit 1 at a temperature of approximately 90° F. as raw sea water, 90° F. being the approximate ambient temperature for which the plant is designed. The conduit 1 feeds a tube-and-shell heat exchanger 2 which is supplied with fresh water at approximately 115° F. through conduit 3. The product fresh water leaves through conduit 4 at a temperature of approximately 100° F., whilst the brine leaves the heat exchanger 2 via conduit 5 at a temperature of approximately 92° F. The conduit 5 feeds a further tube-andshell heat exchanger 6 which is supplied with oil through conduit 7 at a temperature of 118° F., the oil leaving through conduit 8 at a temperature of 106° F. The brine leaves the heat exchanger 6, through conduit 9 at a temperature of 106.5° F. and is rejected apart from a small flow which is tapped off through conduit 10 as brine make-up.

Conduit 10 is connected to a conduit 11 leaving the flash distillation chambers 12, the brine from such chambers being at a temperature of 110° F. A proportion of the total brine in conduits 10 and 11 is rejected as waste brine through conduit 13 and the remainder, at a temperature of 109° F., is recirculated through the main recirculation circuit 14.

The conduit 14 feeds yet another tube-and-shell heat exchanger 15 which is supplied with fresh water at 180° F. through conduit 16, the fresh water leaving through the conduit 3 and the brine leaving through a conduit 17 at a temperature of 114° F. The conduit 17 feeds a liquid/liquid contactor 18 in which the brine is heated by counter-current flow with hot oil entering through conduit 19 and leaving through the conduit 7. The brine itself, at a temperature of 191° F., leaves the liquidliquid contractor 18 through conduit 20 and is passed to the flash distillation chambers 12 through which it flows to emerge at conduit 11. The flash distillation chambers 12 are divided in the conventional fashion and contain the conventional weirs (not shown) in order to promote efficient flashing.

In order to condense the steam in the flash distillation chambers 12, the cool oil in circuit 8 is sprayed by means of a spray head 21 into the last chamber and the oil and fresh water thus formed in the upper part of the chamber is collected in a trough 22, is withdrawn and sprayed into the next chamber and is thus caused to flow counter-current to the flow of brine in the well known way. From the last trough (that in the first flash chamber), the oil-water mixture, at a temperature of 180° F., is withdrawn through a conduit 23 and passed to an oil/water separator 24 from which the fresh water is withdrawn through the conduit 16. The oil is withdrawn through a conduit 25 and passed to a main heat exchanger 26 from which it leaves by the conduit 19, the heat exchanger 26 being heated by process steam entering and leaving through conduits 27 and 28 respectively. It should be pointed out that there is no limitation on the temperature of the process steam as scaling will not take place in the main heat exchanger 26 but the calculations and temperatures mentioned have been based on process steam at 214° F.

If the main brine recirculation stream in conduit 14 is represented by a quantity Q the oil stream flowing in conduit 7 is represented by a quantity 2Q and the product fresh water in conduit 4 by a quantity Q/14. The sea water intake through conduit 1 should then be approximately ¾Q and that flowing in conduit 10 approximately Q/5.

In addition to removing limitations heretofore imposed on the temperature of the process steam used as the primary heat source and on the temperature of the heated brine, the arrangement described reduces the loss in efficiency due to scaling in the primary heat exchanger and also obviates the loss in efficiency due to the presence of condenser tubes in the flash distillation chambers. It will be apparent that increased pumping costs must necessarily be incurred to circulate the oil but the use of a liquid/liquid contactor 18 which is designed to provide contacting and separation ensures that the oil is not fed to the flash chambers so that the size of these chambers does not need to be increased.

We claim:

1. A desalination process, comprising the steps of applying heat from a source external to the process to a water-immiscible oil, heating the brine by means of liquid/liquid contact between the hot oil and the brine, separating the oil from the brine and thereafter passing the brine to at least one flash distillation chamber, cooling the separated oil recovered from said liquid/liquid contact step by indirect heat exchange with raw brine feed, and spraying the oil so cooled into the flash distillation chamber to condense steam therein.

2. A process according to claim 1, wherein the external heat to the oil is provided by process steam in indirect heat exchange therewith.

3. A process according to claim 1, wherein the flash distillation is conducted in a series of chambers with the brine passing therethrough in succession from first to last, and the cooled oil is sprayed first into the condensing section of the last chamber then withdrawn therefrom with the condensate and sprayed into the next to last and so on until the final oil/condensate mixture for separation is withdrawn from the condensing section of the first chamber.

4. A process according to claim 1, wherein the oil is a comparatively long chain paraffin, that is to say of sufficient chain length to remain liquid throughout the process.

5. A process according to claim 1, wherein the oil/condensate mixture obtained from the flash distillation chamber is separated to provide the fresh water product and to recover the oil for reheating and recirculation.

6. A process according to claim 5, wherein the separated condensate is passed in indirect heat exchange with the brine feed to the liquid/liquid contact stage.

7. Desalination apparatus comprising primary heating means effective to heat water-immiscible oil, liquid/liquid contactor/separator means, means conducting the heated oil from said primary heating means to said liquid/liquid contactor/separator means, means delivering raw brine feed to said liquid/liquid contactor/separator means, at least one flash distillation chamber, means withdrawing from said contactor/separator means hot brine feed separated from the oil and passing said separated hot brine feed into said flash distillation chamber, means withdrawing separated oil from said liquid/liquid contactor/separator means and further cooling it by indirect heat exchange with incoming raw brine feed, spray means spraying said further cooled oil into said flash distillation chamber to condense steam therein, and means withdrawing condensate from said chamber.

8. Apparatus according to claim 7, wherein there are a series of flash chambers through which brine feed, after heating by the oil, is delivered in succession from first to last, said spray means sprays the oil into a condensing section of the last chamber, and each preceding flash chamber has its own condensing spray means to which is delivered oil/condensate mixture withdrawn from the condensing section of the chamber immediately following it, until a final oil/condensate mixture is withdrawn from the first chamber.

9. Apparatus according to claim 8, further comprising a separator receiving the final oil/condensate mixture from the flash distillation chambers and separately delivering the condensate as a product stream and the oil back to the primary heating means.

10. Apparatus according to claim 9, further comprising a heat exchanger placing the product stream in indirect heat exchange with the raw brine feed passing to the liquid/liquid contactor.

References Cited

UNITED STATES PATENTS

| 3,219,554 | 11/1965 | Woodward | 202—173 |
| 3,232,847 | 2/1966 | Hoff | 203—173 |
| 3,236,747 | 2/1966 | Margiloff | 203—173 |
| 3,298,932 | 1/1967 | Bauer | 203—173 |
| 3,337,421 | 8/1967 | El-Roy | 203—173 |

FOREIGN PATENTS

| 1,026,375 | 4/1966 | Great Britain. |

OTHER REFERENCES

Technic of Organic Chemistry, vol. 12, "Distillation," Editor Weissberger, p. 213.

"Distillation," by Hengstebeck, Rheinhold Chem. Engy. Series, 1961, Rheinhold Publishing Corp., N.Y., pp. 17, 18, 19.

NORMAN YUDKOFF, Primary Examiner

J. SOFER, Assistant Examiner

U.S. Cl. X.R.

202—173, 204, 234; 203—88, 200